United States Patent [19]
Phillips et al.

[11] Patent Number: 5,116,476
[45] Date of Patent: May 26, 1992

[54] ATMOSPHERIC DIFFUSER IMPROVED LOWER SCREENS BACKFLUSHING

[75] Inventors: Joseph Phillips; J. Robert Prough; Victor Bilodeau; Brian Greenwood; Ronald Bain; John Weston, all of Glen Falls, N.Y.

[73] Assignee: Kamyr Inc., Glens Falls, N.Y.

[21] Appl. No.: 628,090

[22] Filed: Dec. 17, 1990

[51] Int. Cl.$^5$ .................. D21C 9/04; B01D 33/06
[52] U.S. Cl. .................... 162/60; 210/388; 210/411; 68/181 R
[58] Field of Search ............... 210/388, 411; 162/60; 68/171 R

[56] References Cited

U.S. PATENT DOCUMENTS

| | | | |
|---|---|---|---|
| 3,815,386 | 6/1974 | Gullichsen et al. | 1.68/181 R |
| 4,172,037 | 10/1979 | Golston | 210/315 |
| 4,971,694 | 11/1990 | Richter | 210/411 |

Primary Examiner—W. Gary Jones
Assistant Examiner—Brenda Lamb
Attorney, Agent, or Firm—Nixon & Vanderhye

[57] ABSTRACT

In an atmospheric diffuser for the treatment of paper pulp (thickening, bleaching, and/or washing) the flow of backflushing liquid is controlled so as to maximize the effective treatment of the pulp. The pulp passes upwardly in a vessel. A number of annular screen assemblies are provided, with at least one screen associated with each screen assembly. The lower screen includes a barrier wall with a passage in the barrier wall adjacent the bottom end of the screen. Liquid which flows through the screen must flow to the passage in order to be withdrawn from the vessel, as the screen is slowly moved upwardly. When the screen is rapidly moved downwardly to cause backflushing, the backflushing liquid at the top end of the screen is liquid that recently passed through the screen at that point, so the pulp at that point—which is the cleanest along the length of the screen—has a minimal chance of being contaminated. The barrier may be provided by a number of tubes separated by webs, or a number of channels separated by webs. A baffle may be mounted between each passage and screen to redirect the backflushing liquid so that it does not merely backflush the bottom portion of the screen.

15 Claims, 4 Drawing Sheets

FIG. 5
FIG. 6
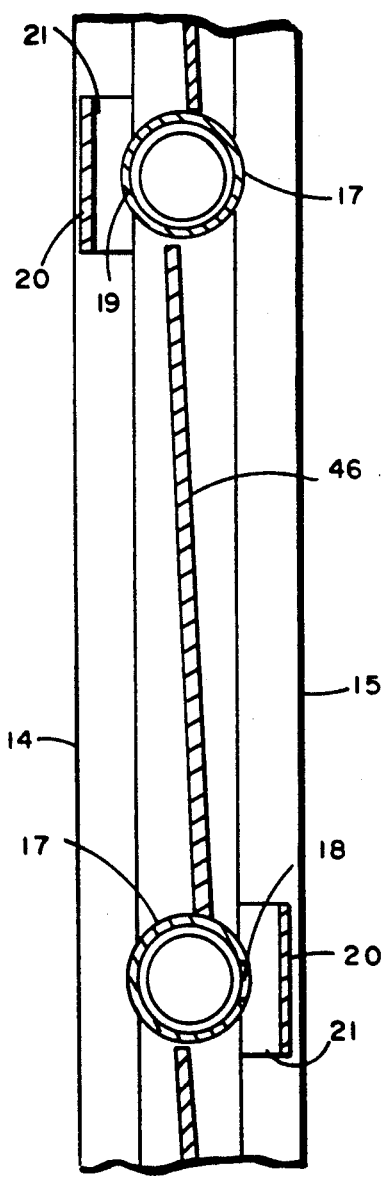
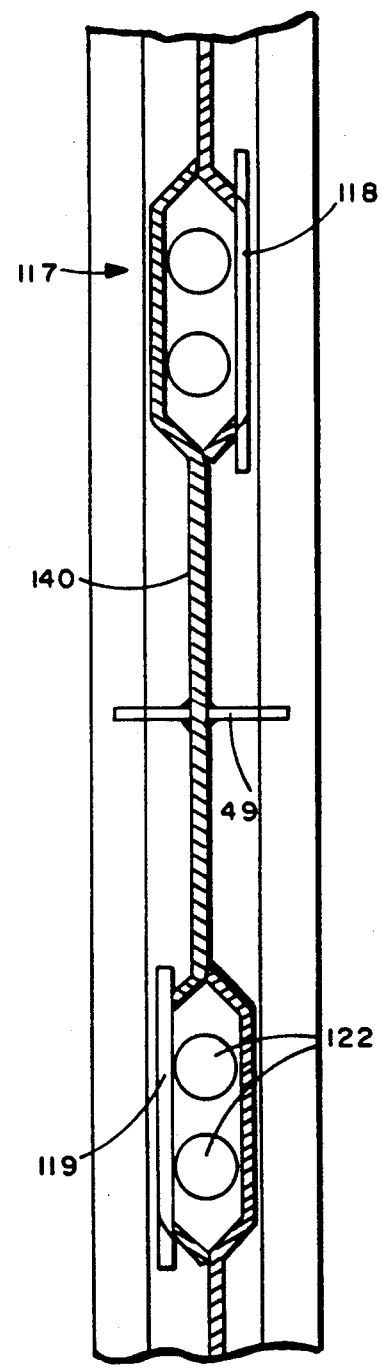

ATMOSPHERIC DIFFUSER IMPROVED LOWER SCREENS BACKFLUSHING

BACKGROUND AND SUMMARY OF THE INVENTION

An atmospheric diffuser is a successful piece of equipment for treating paper pulp and the like. Although such structures can be used only for thickening, typically diffusers are used for washing, bleaching, or otherwise treating pulp, with a treatment liquid. The diffusers are often provided with multiple stages, having a number of screen assemblies. Typical multiple stage diffusers are illustrated in U.S. Pat. Nos. 3,815,386 and 4,172,037, the disclosures of which are incorporated by reference herein.

In conventional atmospheric diffusers, normally the pulp flows upwardly in the diffuser vessel, flowing past the bottom and then past the top of screens extending downwardly from an arm which receives liquid which passes through the screens, for ultimate withdrawal from the vessel. In tests on the efficiency of diffusers, it was surprisingly found that the lower screens in each stage—the screens that extend downwardly from the mounting arm, when the pulp is flowing upwardly in the vessel —had significantly less efficiency than the upper screens of each stage. After investigation and analysis, it was determined that the source of this problem of relatively poor screen efficiency was contamination of the cleanest portion of the pulp as it flowed upwardly with backflush liquid that was dirtier than that just withdrawn from the pulp at the upper end of the screen.

In order to solve the above identified problem, according to the present invention, the pathway that the liquid being withdrawn from the pulp must take as it passes through the screens, is down toward the bottom of the screen. Thus, when backflushing action occurs by rapid downward movement of the screen, the backflushing liquid at the top of the screen will be relatively clean liquid which has just passed through the screen at that point, rather than much dirtier liquid in conventional atmospheric diffusers. The pulp is preferably caused to take this path by providing barriers—such as tubes or channels—within the screens with passages adjacent the second ends of the screens. In order to make the backflushing action as uniform as possible, a baffle is mounted in front of the passage—between the passage and the screen—to redirect the backflushing liquid flowing through the passage.

According to one aspect of the present invention, an atmospheric diffuser for treating cellulosic fibrous material pulp is provided. The diffuser comprises: a generally upright vessel; a plurality of arms mounted within the vessel for up and down movement; a plurality of annular screen assemblies mounted on the arms, each assembly including at least one screen; conduit mean for transporting liquid passing into the screen assemblies from pulp in the vessel, into the arms and out of the vessel; at least one screen of each screen assembly having an outer face and an inner face, the outer face first encountering the pulp as it moves in its direction of movement, with the arms operatively connected to the screen face at the downstream end thereof in the direction of pulp movement; means for moving the arms up and down in movement coincident with pulp flow in one direction and to cause backflushing of liquid through the screens in the other direction; and means for directing backflushing liquid from the inner face of the screen back through the screen so that the backflushed liquid passing through the screen adjacent the downstream end thereof has substantially the same properties as liquid just withdrawn through the screen at that point. The means for directing the backflushing liquid preferably comprise barrier means with passages in the barrier means adjacent the second end of the screens. Baffle means are mounted between the passages and the screen innerface for redirecting the backflushing fluid.

The barrier means preferably comprise a plurality of tubes and are connected by webs, or a plurality of channels that connected by webs. Preferably, each screen assembly includes two concentric screens with the barriers disposed within the annular space between the screens, in which case the barrier tubes or channels may each have two passages therein—one facing each screen—or alternate tubes or channels can have a passage facing one way, with the next tube or channel passage facing the other way.

According to another aspect of the present invention, a method of treating cellulosic fibrous material pulp in an upright vessel is provided. The method comprises the steps of: (a) causing the pulp to flow in a first vertical direction in the vessel, the pulp when flowing in the first direction initially encountering the second end of the screen, and the flowing to and past the first end thereof, some liquid in the pulp passing through the screen; (b) withdrawing liquid flowing through the screens from the vessel; (c) periodically causing a flow of backflushing liquid back through the screen into the pulp; and (d) controlling the backflushing liquid so that the liquid backflushing the screen at the first end thereof is liquid that passed through the screen substantially at the first end of the screen. The method also preferably comprises the step (e) of introducing treatment liquid into the pulp adjacent the annular screen. Step (d) is practiced by defining a path requiring flow of pulp passing through the first end of the screen to the second end of the screen. The first vertical direction—the direction of flow—of the pulp preferably is upwardly, and the screen is moved slowly upwardly with the pulp when treatment liquid is passing through the screen, and is moved quickly downwardly to effect backflushing.

According to another aspect of the present invention, a screen assembly per se is provided. The screen assembly comprises: first and second annular bars; at least one annular screen; the screen connected at a first end thereof to the first bar, and at the second end thereof to the second bar; means defining a plurality of spaced through extending openings in the first bar; a barrier extending from the first bar substantially to the second bar and spaced from the screen, the barrier separating the screen from the plurality of openings; and means defining a plurality of passages in the barrier adjacent the second end of the screen so that liquid passing through the screen must flow through the passage to enter the openings. Preferably two concentric screens are provided with the barrier between them, and the barrier comprises a plurality of tubes separated by webs, or a plurality of channels separated by webs.

It is a primary object of the present invention to provide for the more efficient treatment of pulp or the like in atmospheric diffusers or the like. This and other objects of the invention will become clear from an inspection of a detailed description of the invention, and from the appended claims.

BRIEF DESCRIPTION OF THE DRAWINGS

FIG. 5 is a longitudinal cross-sectional view at the passage and baffle plate of one embodiment of the screen assembly according to the present invention; and FIG. 6 is a view like that of FIG. 5 only for a second embodiment.

DETAILED DESCRIPTION OF THE DRAWINGS

Figure 1:
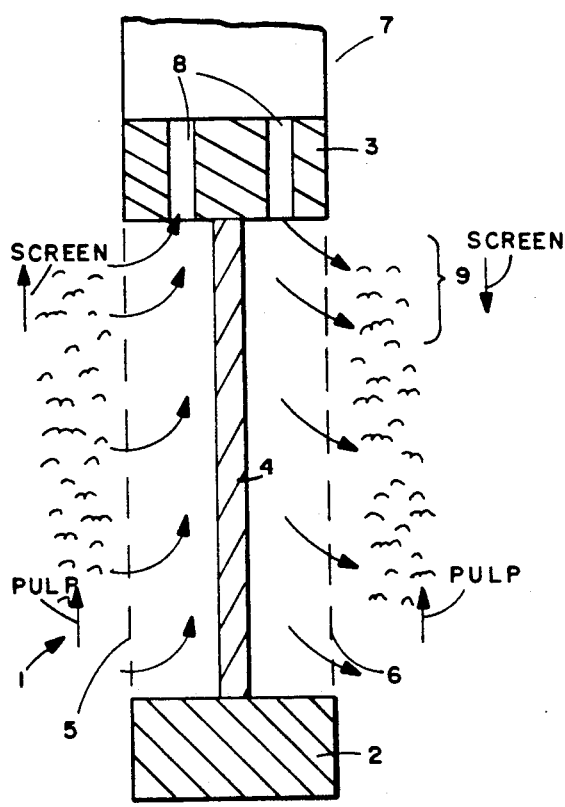
FIG. 1 is a cross-sectional view of the lower screen of a typical prior art screen assembly for an atmospheric diffuser.

Generally indicated by reference numeral 1 in FIG. 1 is a conventional lower screen assembly of a conventional atmospheric diffuser, such as shown in U.S. Pat. Nos. 3,815,386 or 4,172,037. This screen assembly includes a lower annular bar 2, an upper annular bar 3, a connecting web 4 between the bars 2, 3, first and second concentric annular screens 5, 6 extending between the bars 2, 3, and a header 7 (ultimately attached to a supporting arm) for receiving liquid which passes through the openings 8 in the bar 3 to be withdrawn from the diffuser. As illustrated on the left hand side of FIG. 1, typically the pulp moves upwardly, as the screen assembly 1 moves upwardly at substantially the same speed as the pulp movement, spent treatment liquid (e.g. wash water or bleach liquid) passes through the screen 5 and ultimately into the passage 8, to be discharged from the diffuser. Once the screen assembly 1 reaches its upper limit of travel, the screens 5 and 6 are backflushed—to prevent matting of the pulp thereon, which would clog the screen openings—by rapidly moving the assembly 1 downwardly. This is illustrated schematically on the right hand side of FIG. 1.

When the screen assembly 1 is reciprocated downwardly rapidly, the liquid between the screen 6 and web 4, and even some of the liquid in the passages 8 and possibly even header 7, flows outwardly through the screen as indicated by the horizontal arrows in FIG. 1. The problem is that the backflushing liquid at the top of the screen—adjacent bar 3—is a mixture of the dirtiest liquid, which passes through the bottom end of the screen (closest to the bar 2) upwardly toward the openings 8, as well as the liquid which has just passed through the top of the screen. Since the pulp gets progressively cleaner as it moves upwardly, as indicated by the liquid passing through the screens 5, 6 being progressively cleaner at progressive points along the screen, when the backflushing action occurs, the liquid in the zone 9 in FIG. 1 is dirtier than the rest of the liquid in the pulp at that zone, causing a slug of contaminated pulp at that zone, and thereby reducing the efficiency of the screen assembly 1.

Figure 2:
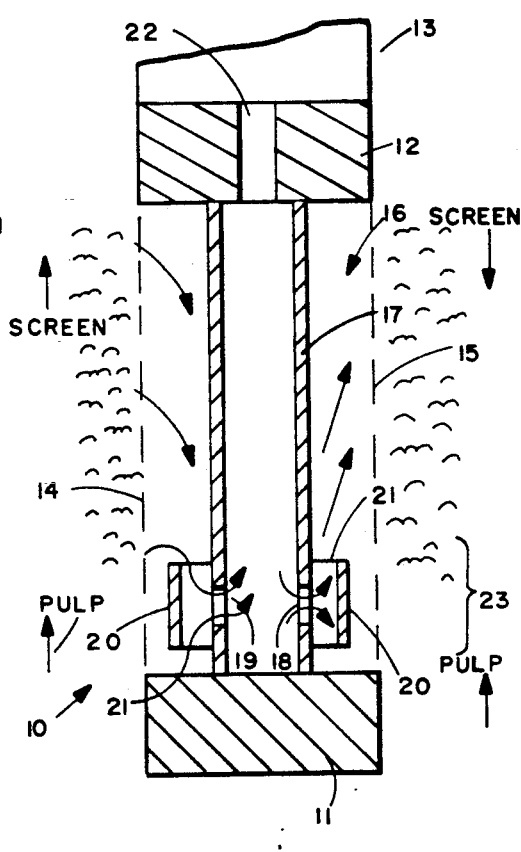
FIG. 2 is a view like that of FIG. 1 only showing an exemplary lower screen of the screen assembly according to the invention.

The screen assembly illustrated generally by reference numeral 10 in FIG. 2 solves the problem of contaminating relatively clean pulp with relatively dirty liquid which is illustrated in FIG. 1. The screen assembly 10 includes annular mounting bars 11, 12 at the second and first end of the annular concentric screens 14, 15, respectively, the upper bar 12 connected to a header 13 which is ultimately connected to a supporting arm. Barrier means 16 are provided interiorly of the screens 14, 15, which barrier means may comprise spaced tubular elements 17 having passages 18, 19 adjacent the second, bottom ends of the screens 14, 15. Associated with each of the passages 18, 19 there preferably is provided a baffle plate 20, which is mounted—as by horizontal tabs 21 at opposite ends of the plate 20—between the passages 18, 19 and the inner faces of the screens 14, 15, to redirect the flow of backflushing liquid. Liquid which passes to the interior of the tube 17 ultimately passes through opening 22 in the upper bar 12 into the header 13, and ultimately into the supporting arms for discharge from the diffuser.

As is illustrated by the arrows in FIG. 2 when the screen and pulp are moving upwardly together—as illustrated on the left hand side in FIG. 2—the spent treatment liquid flows through the screen 14, and ultimately passes through the passage 18 into the interior of the tube 17 and ultimately out the opening 22. When the screen assembly 10 is moved rapidly downwardly—as illustrated in the right hand side of FIG. 2—the liquid between the screens 14, 15 and the barrier means 16 flows outwardly through the screen. At the top, first end of the screen, adjacent the top bar 12, the backflushing liquid will essentially be liquid as clean as the liquid that was just withdrawn through the top part of the screen at that point, meaning a slug of contaminated liquid will not enter the pulp flow there. The dirtiest liquid will be at zone 23, at the bottom of the screen; the pulp in zone 23 will have a chance to be further treated with treatment liquid as it moves upwardly in the diffuser. The baffles 20 will redirect the flow of backflushing liquid at the bottom of the screen so that the backflushing liquid will not have a tendency to merely flush out the bottom part of the screen but will be redistributed relatively uniformly along the length of the screens 14, 15.

Figure 3:
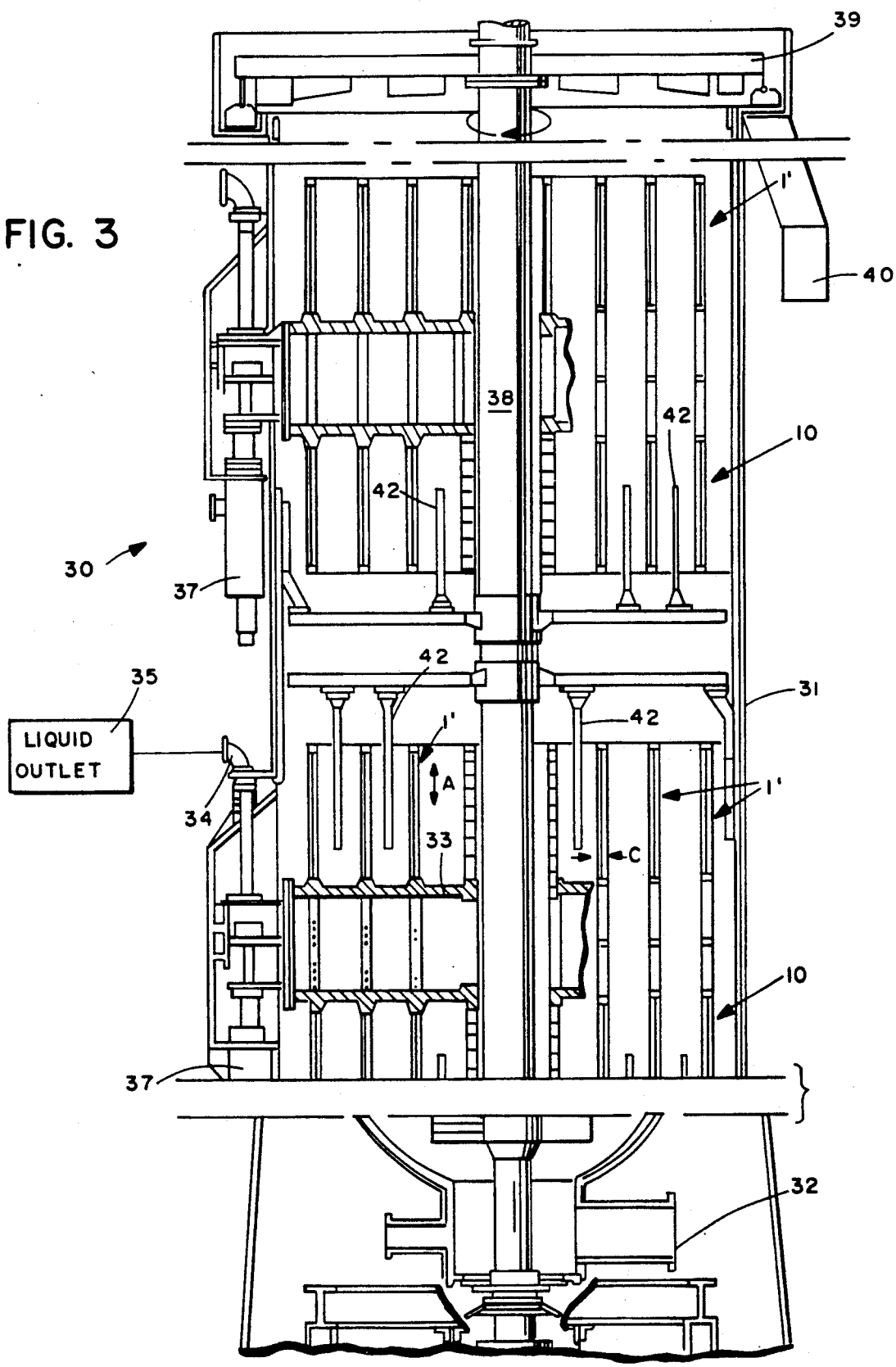
FIG. 3 is a cross-sectional view partly in elevation of an exemplary pulp-treating assembly according to the invention, utilizing lower screens as illustrated in FIG. 2.

One exemplary positioning of the screen assemblies 10 according to the present invention in an atmospheric diffuser is shown in FIG. 3. The atmospheric diffuser is shown generally by reference numeral 30, including a generally upright vessel 31 having a plurality of radially extending arms 33 and with a pulp inlet 32 at the bottom of the vessel 31. The arms 34 are connected to the headers 13 in conventional manners (as exemplified by said U.S. Pat. Nos. 3,815,386 and 4,172,036), the withdrawn liquid passing through the arms 33 ultimately to a withdrawal conduit or connection 34, and being discharged into the discharge area 35 outside of the vessel 31. The arms 33 are reciprocated up and down by the hydraulic piston and cylinders 37 or like means. The arms 33—and associated screen assemblies 10—are moved slowly upwardly in the direction of pulp flow (at essentially the same speed as the pulp flow), but are moved rapidly downwardly (that is opposite the pulp flow) to effect backflushing.

A central shaft 38 is preferably provided which rotates about a vertical axis, and has a scraper 39 at the top thereof for the discharge of treated pulp into the pulp discharge 40. Fluid treatment introduction structures 42 are mounted to the shaft 38 for rotation therewith, and uniformly introduce treatment liquid—such as wash water or bleach—into the pulp between the annular screen assemblies 10, 11. Note that in the exemplary construction in FIG. 3, the screen assemblies 10 according to the present invention are provided just as the lower screen is associated with the arms, whereas the upper screens 33 are indicated by referenced numeral 1', and are comparable to the conventional screens illustrated in FIG. 1 (only they extend upwardly instead of downwardly).

Figure 4:
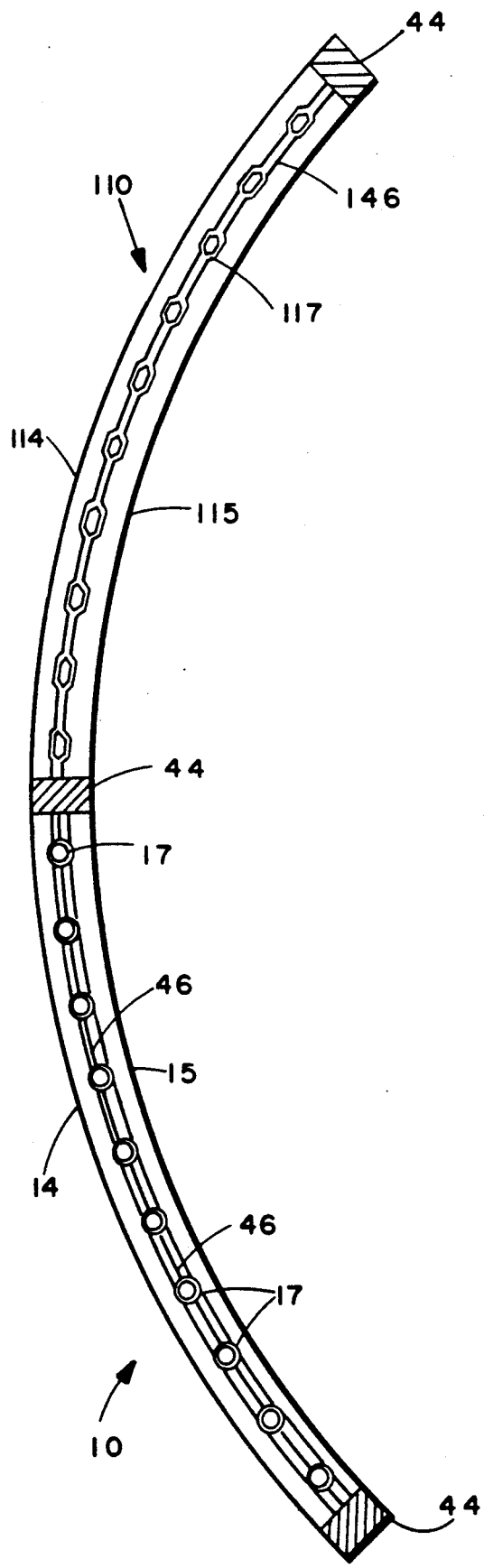
FIG. 4 is a top view, partly in cross section and partly in elevation, of an arc of a lower screen assembly according to the invention.

FIG. 4 illustrates an arc of one of the screen assemblies 10 according to the invention, it being understood that the entire screen assembly will be annular. Vertical supporting walls 44 are provided at predetermined positions along the screen assembly 10, interconnected between the upper and lower bars 12, 11, respectively, and between the tubes 17, webs 46 are provided. The webs 46 are desirable because to provide tubes extending the entire circumference of the screen assembly 10 would not be cost justified.

In the upper half of FIG. 4, a modification of the screen assembly 10, which modification is also according to the present invention, is provided. In the modification illustrated in the upper part of FIG. 4 structures comparable to those in the first embodiment are illustrated by the same reference, but only preceded by a "1". In this embodiment the screen assembly 110 is substantially the same as the screen assembly 10 except that the barriers are provided by channels 117 instead of tubes 17, with webs 146 extending between the channels 117.

The distinctions between the first and second embodiments will be more clearly seen by inspection of FIGS. 5 and 6. Note that in the FIG. 6 embodiment it is desirable to provided two openings 122 in the upper bar 112, rather than one opening 22, associated with each of the channels 117 since the channels 117 have a larger cross sectional area than the tubes 17. Note that the illustration in FIG. 5 is slightly different than that in FIG. 2. In FIG. 2, the passages 18, 19—one associated with each of the screens 15, 14, respectively—are provided in each tube 17. In the FIG. 5 embodiment, each tube 17 has only one passage, the passages 18, 19 alternating from one tube 17 to the next so that one passage (18) is directed toward the inner surface of screen 15 for one tube, and then for the next tube 17 the passage 19 is directed toward the inner surface of the other screen 14. The same alternating configuration of the passages 118, 119 is illustrated in FIG. 6 for the channel embodiment.

In the utilization of the atmospheric diffuser 30 in the treatment of cellulosic fibrous material pulp in the upright vessel 31 using at least one annular screen assembly 10, the following method is practiced. The pulp is introduced into inlet 32 and flows vertically, upwardly, in the vessel 31, ultimately the treated (e.g. washed, thickened and/or bleached pulp) being discharged by scraper 39 into pulp outlet 40. As the pulp moves upwardly in the vessel 31, treatment liquid is introduced by conventional rotating liquid introducing nozzles 42, spent treatment liquid passing through the screens 14, 15, ultimately flowing through the openings 22 into the headers 13 and arms 33, and being ultimately discharged into liquid outlet 35. This withdrawal action occurs during the entire upward movement of the screen assembly 10 by the hydraulic cylinders 37.

Once the screen assemblies 10 reach their upper limit of travel, the hydraulic cylinders 37 move the screen assemblies 10 downward rapidly. This causes the screens 14, 15 to be backflushed. Since the liquid that will be backflushing the upper portion (first ends) of the screens 14, 15 is relatively clean liquid which has just been withdrawn through that portion of screens, there will be no slug of relatively dirty liquid entering relatively clean pulp, as occurs in the prior art procedure of FIG. 1. Thus, the backflushing is controlled—by the barrier 16 and associated passages 18, 19 and located openings 22—so that efficiency of the screen assemblies 10 is enhanced.

It will thus be seen that according to the present invention method, atmospheric diffuser, and screen assembly have been provided which overcome a problem in the prior art that was identified as part of the present invention, providing for enhanced efficiency of the lower screens of a conventional diffuser. While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent apparatus, components, and methods.

What is claimed is:

1. An atmospheric diffuser for treating cellulosic fibrous material pulp, comprising:

a generally upright vessel;

a plurality of arms mounted within said vessel for up and down movement;

a plurality of annular screen assemblies mounted on said arms, each assembly including at least one screen having holes therein;

conduit means for transporting liquid passing into said screen assemblies from pulp in said vessel, into said arms and out of said vessel;

at least one screen of each screen assembly having an outer face and an inner face, said outer face first encountering the pulp as it moves in its direction of movement, with the arms operatively connected to the screen face at the downstream end thereof in the direction of pulp movement;

means for moving said arms up and down in movement coincident with pulp flow in one direction and to cause backflushing of liquid through the screens in the other direction;

means for directing backflushing liquid from said inner face of said screen back through said screen so that the backflushed liquid passing through the screen adjacent the downstream end thereof has substantially the same properties as liquid just withdrawn through the screen at that point wherein said arms are hollow, and further comprising means defining an opening from the inner face of said screen to a hollow interior of said arms at a first end of said screen, said opening distinct from said screen holes; and wherein means for directing backflushing liquid comprises barrier means for preventing liquid which passes through said screen adjacent said first end thereof from directly passing into said opening, said barrier means extending from said first end of said screen to adjacent a second end of said screen, remote from said first end, and means defining a passage in said barrier means adjacent said second end thereof.

2. A diffuser as recited in claim 1 further comprising a baffle means mounted adjacent said passage in said barrier means, said baffle means for redirecting the flow of backflushing liquid through said passage.

3. A diffuser as recited in claim 2 wherein said barrier means comprises a plurality of hollow circular cross-section tubes, a passage formed in each tube.

4. A diffuser as recited in claim 2 wherein said barrier means comprises a plurality of channels, non-circular in cross-section a passage formed in each channel.

5. A diffuser as recited in claim 1 wherein at least one of said screen assemblies comprises two concentric screens radially spaced from each other; and wherein said barrier means divides the annular space between said screens so that the inner faces of said screens are not in direct communication with each other.

6. A diffuser as recited in claim 5 wherein said barrier means comprises a plurality of tubes interconnected by webs, at least one passage defined in each of said tubes.

7. A diffuser as recited in claim 6 wherein two passages are defined in each tube, each passage facing the inner surface of one of said screens.

8. A diffuser as recited in claim 6 wherein only one passage is defined in each tube, the passage in one tube facing the inner surface of one screen, and the passage in the adjacent tube facing the inner surface of the other screen, and this alternating sequence of passages being provided for all of the tubes.

9. A diffuser as recited in claim 6 further comprising a baffle means mounted adjacent said passage in said barrier means for redirecting the flow of backflushing liquid through said passage.

10. A diffuser as recited in claim 5 wherein said barrier means comprises a plurality of channels with webs interconnecting the channels, at least one passage being formed in each channel.

11. A diffuser as recited in claim 5 further comprising treatment fluid introduction structures disposed between said annular screen assemblies for introducing treatment fluid into the pulp flowing in the vessel.

12. An assembly for processing pulp comprising:
a generally upright vessel;
a plurality of arms mounted within said vessel for up and down movement;
at least one annular screen assembly including at least one screen having a first end and a second end, and holes formed in said screen;
means for connecting said screen assembly to said arms adjacent said first end of said screen, said means including a wall and means defining an opening for the passage of liquid therethrough in said wall, said opening distinct from said screen holes;
a barrier extending substantially the length of the screen, between the first and second ends thereof, and separating the screen from said opening in said wall, and means defining a passage in said barrier adjacent the second and of said screen, through which liquid must flow to enter said opening in said wall; and
means for moving said arms up and down in movement coincident with pulp flow in one direction, and to cause backflushing of liquid through the screen in the other direction.

13. Apparatus as recited in claim 12 further comprising a baffle plate, and means for mounting said baffle plate between said screen and said passage so that said baffle plate redirects the flow of liquid passing from the side of said barrier opposite said screen toward said screen.

14. Apparatus as recited in claim 12, wherein said screen assembly comprises two concentric screens, said barrier separating said concentric screens; and wherein said barrier comprises a plurality of tubes with webs extending between the tubes, said passages formed in said tubes.

15. Apparatus as recited in claim 12 wherein said screen assembly comprises two concentric screens, said barrier separating said concentric screens; and wherein said barrier comprises a plurality of channels with webs extending between the tubes, said passages formed in said channels.

* * * * *